(12) United States Patent
Takahashi (10) Patent No.: US 8,995,026 B2
(45) Date of Patent: Mar. 31, 2015

(54) IMAGE READING APPARATUS WITH CORRECTION USING DIFFUSE REFLECTION SURFACE AND IMAGE FORMING APPARATUS WITH SAME

(71) Applicant: Canon Kabushiki Kaisha, Tokyo (JP)

(72) Inventor: Masafumi Takahashi, Noda (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 13/915,423

(22) Filed: Jun. 11, 2013

(65) Prior Publication Data

US 2013/0342876 A1 Dec. 26, 2013

(30) Foreign Application Priority Data

Jun. 22, 2012 (JP) ................................. 2012-140637

(51) Int. Cl.
  *H04N 1/40* (2006.01)
  *H04N 1/401* (2006.01)
  *H04N 1/407* (2006.01)
(52) U.S. Cl.
  CPC ........... *H04N 1/40093* (2013.01); *H04N 1/401* (2013.01); *H04N 1/4076* (2013.01)
  USPC ......... 358/448; 358/474; 399/140; 250/208.1
(58) Field of Classification Search
  None
  See application file for complete search history.

(56) References Cited

U.S. PATENT DOCUMENTS

| 7,695,131 | B2 * | 4/2010 | Yun et al. ....................... 347/105 |
| 7,813,005 | B2 * | 10/2010 | Arai ................................ 358/2.1 |
| 2004/0161862 | A1 * | 8/2004 | Golovlev et al. ............. 436/525 |

FOREIGN PATENT DOCUMENTS

JP 2007-081968 3/2007

* cited by examiner

*Primary Examiner* — Steven Kau
(74) *Attorney, Agent, or Firm* — Fitzpatrick, Cella, Harper & Scinto (57) ABSTRACT

An image reading apparatus includes: an image reading unit which has a light source irradiating light to a sheet conveyed along reading glass, and an image reading element reading an image by reflected light from the sheet; a conveyance guide portion which guides the sheet and which is disposed in a position, that corresponds to the image reading unit, with the reading glass interposed between the conveyance guide portion and the image reading unit; a correction unit which corrects image information obtained by reading the sheet by the image reading unit based on reflected light that is emitted from the light source and reflected on the conveyance guide portion; and the conveyance guide portion which has a diffuse reflecting surface diffusing and reflecting the light from the light source.

13 Claims, 11 Drawing Sheets

FIG. 12C

IMAGE READING APPARATUS WITH CORRECTION USING DIFFUSE REFLECTION SURFACE AND IMAGE FORMING APPARATUS WITH SAME

BACKGROUND OF THE INVENTION

1. Field of the Invention

The present invention relates to an image reading apparatus and an image forming apparatus, and more particularly, to a white reference member for correcting image information obtained by reading an original.

2. Description of the Related Art

Up to now, as an image forming apparatus such as a digital copier, a printer, or a facsimile machine, there is an image forming apparatus including an image forming unit and an image reading apparatus, for causing the image forming unit to form an image based on image information read by the image reading apparatus. As a reading method performed by the image reading apparatus, there is a method of reading an original image, in which an original, which being a sheet, is placed on a platen glass plate, the original is then brought into intimate contact with the platen glass plate by a pressure plate, and an image reading unit performs scanning in this state.

Further, as the reading method performed by the image reading apparatus, there is a method (hereinafter referred to as "flow reading") of using the image reading unit to read the original image by stopping the image reading unit under a predetermined original reading position of the platen glass plate and conveying the original over the original reading position by using an ADF at a constant speed.

The image reading unit is provided with a light source being a lighting device for illuminating the original. As the light source, in recent years, there is a light source using an LED array obtained by aligning multiple LEDs (light emitting diodes) in a straight line for purposes of low power consumption, downsizing, and the like. In order to maintain image reading accuracy at a constant level, the image reading apparatus periodically executes shading correction for correcting unevenness in density level that occurs due to characteristics of an image pickup element, influence of a lens aberration, and the like. In a case where the flow reading is continuously performed by using the ADF, a shading correction value is acquired before reading the first original, and then the shading correction is performed by using the same shading correction value until the continuous flow reading is finished.

In the case where the flow reading is continuously performed, factors relating to image quality highly depend on the light source, and deterioration of the light source greatly influences the reading of the original. Specifically, after the light source starts illuminating, an illuminance and a distribution of light amounts in a main scanning direction fluctuate due to a change in temperature of the light source. Therefore, in a case of continuously reading originals, the influence of the deterioration of the light source appears between, for example, data obtained by reading the first original and data obtained by reading the hundredth original, which causes differences between pieces of data obtained by reading the originals.

Up to now, as disclosed in Japanese Patent Application Laid-Open No. 2007-081968, there is known a technology in which, in the case where the flow reading is continuously performed, for each interval between the originals, an average value of light amounts is acquired based on image data corresponding to a predetermined number of pixels at several points in the main scanning direction of a reference target object, and fluctuation amounts of the light amounts are calculated, to thereby correct light distribution fluctuations of illumination in the main scanning direction. In light distribution fluctuation correction, first, before reading the image of the first original among multiple originals, a first white reference member is read by the image reading unit to create shading correction data. Further, before reading the first original, a second white reference member is illuminated by the image reading unit, and light amount values from the illuminated second white reference member are sampled to create first pieces of data.

Subsequently, after reading the first image, the light amount values from the second white reference member illuminated by the image reading unit are sampled to create second pieces of data. The fluctuation amounts of the light amounts are obtained by comparing the first pieces of data with the second pieces of data, and the shading correction data is corrected by using the fluctuation amounts of the light amounts to correct the image data. In the original reading position, the image reading unit reads the image of the original while the original is passing between glass and an opposing member disposed so as to be opposed to the glass. The opposing member opposed to the glass is used as the second white reference member, and reflected light from the opposing member is sampled. Accordingly, without moving the image reading unit from a flow reading position, it is possible to appropriately correct the image data based on fluctuations in the light amounts of the light source.

In order to perform appropriate correction by using the conventional image reading apparatus, the second white reference member (opposing member) read by the image reading unit needs to have uniform reflection property. In a case where light that is reflected by the opposing member and enters a light-receiving unit is specularly reflected light, the light distribution fluctuation correction is performed for a region from which the specularly reflected light enters the light-receiving unit to correct a luminance level of the image to become lower. This may cause such image degradation that the image becomes partially dark.

SUMMARY OF THE INVENTION

The present invention has been made in view of the above-mentioned circumstances, and an object thereof is to provide an image reading apparatus and an image forming apparatus that are capable of preventing image degradation due to specular reflection of light from a light source without fail.

An image reading apparatus according to an example of the present invention, includes: an image reading unit which has a light source irradiating light to a sheet conveyed along reading glass, and an image reading element reading an image by reflected light from the sheet; a conveyance guide portion which guides the sheet and which is disposed in a position, that corresponds to the image reading unit, with the reading glass interposed between the conveyance guide portion and the image reading unit; a correction unit which corrects image information obtained by reading the sheet by the image reading unit based on reflected light that is emitted from the light source and reflected on the conveyance guide portion; and the conveyance guide portion which has a diffuse reflecting surface diffusing and reflecting the light from the light source.

An image reading apparatus according to another example of the present invention, includes: an image reading unit which has a light source irradiating light to a conveyed sheet, and an image reading element reading an image by reflected light from the sheet; a conveyance guide portion which guides the conveyed sheet in a position for reading the image of the sheet; a correction unit which corrects image information obtained by reading the sheet by the image reading unit by using information of reflected light that is emitted from the light source and reflected on the conveyance guide portion; and a reflecting surface which is provided to the conveyance guide portion and reflects the light from the light source, and the reflecting surface having a ten-point average surface roughness Rz and an average distance S between local peaks satisfying the following requirements, 3.0 µm<Rz, and S<0.09 mm.

Further features of the present invention will become apparent from the following description of exemplary embodiments with reference to the attached drawings.

DESCRIPTION OF THE EMBODIMENTS

Figure 1:
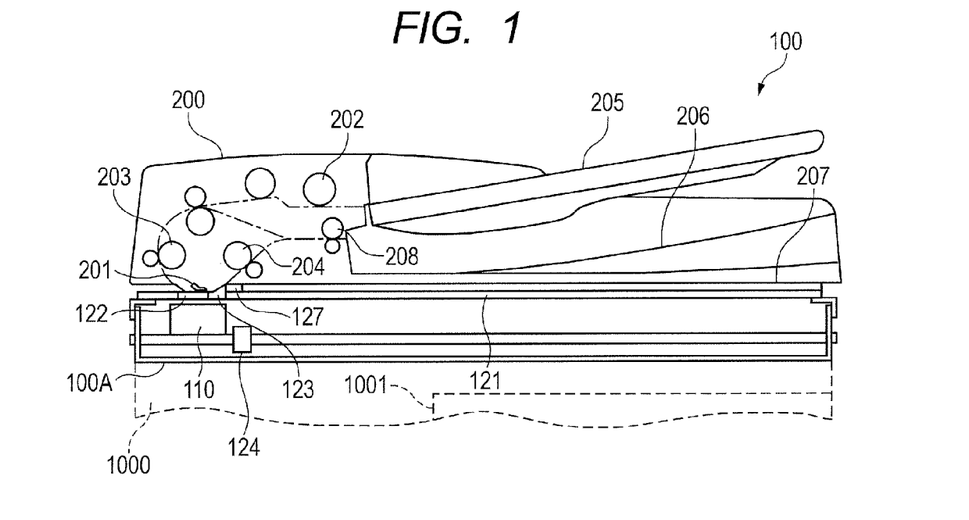
FIG. 1 illustrates a configuration of an image reading apparatus according to an embodiment of the present invention.

Now, a mode for carrying out the present invention is described in detail with reference to the accompanying drawings. FIG. 1 illustrates a configuration of an image reading apparatus according to an embodiment of the present invention. An image reading apparatus main body 100A of an image reading apparatus 100 illustrated in FIG. 1 is hereinafter referred to as "apparatus main body". The following description is directed to a single unit of the image reading apparatus, but the present invention can be applied to an image forming apparatus 1000 (indicated by the broken line) which is provided with the image reading apparatus 100 and causes an image forming unit 1001 (indicated by the broken line) to form an image based on original image information read by the image reading apparatus 100.

The apparatus main body 100A has an upper surface to which flow reading glass 122 and original table glass 121 are mounted, and includes an image reading unit (hereinafter referred to as "reader unit") 110 for reading an image of an original being a sheet on which the image is formed. The image reading apparatus 100 includes an auto document feeder (hereinafter referred to as "ADF") 200 for supplying the original to an original reading position for the reader unit 110.

Figure 2:
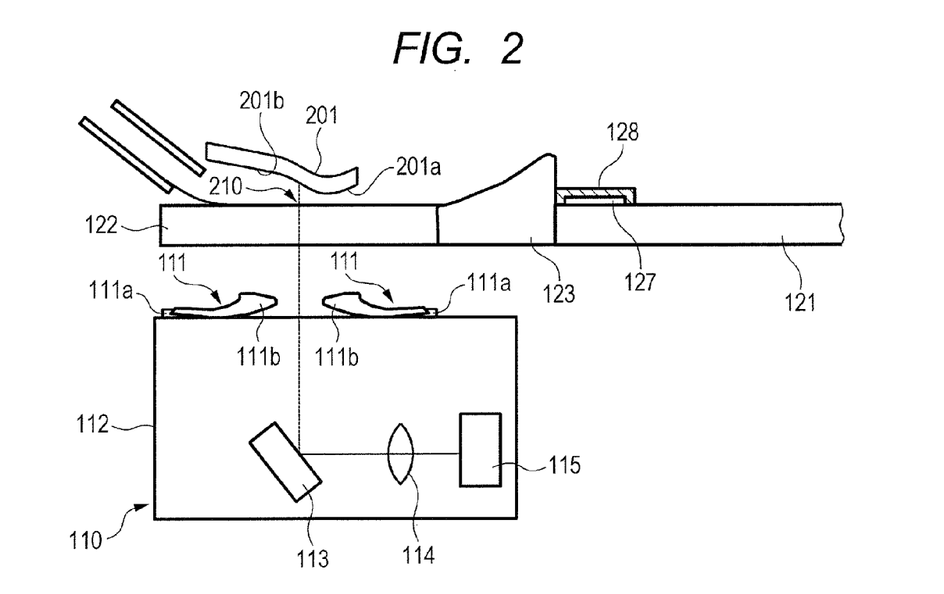
FIG. 2 illustrates configurations of a reader unit and an ADF provided to the above-mentioned image reading apparatus.

As illustrated in FIG. 2, the reader unit 110 includes LED arrays 111 including light guiding bodies 111b and LEDs 111a serving as a light source for irradiating light to a surface of the original. Further, the reader unit 110 includes a mirror 113 for guiding reflected light from the original corresponding to the light irradiated by the LED arrays 111 to an image sensor 115 being an image reading element through a lens 114. The LED arrays 111 are provided outside a casing 112, while the mirror 113, the lens 114, and the image sensor 115 are integrally received inside the casing 112.

The reader unit 110 reads the original in any one mode of a flow reading mode (an original reading mode using the ADF) and a fixed-reading mode (an original reading mode using the original table glass) that is selected by a user. In the flow reading mode, the image of the original is read while the ADF 200 causes the original to pass through the original reading position (an image reading position) 210 on the flow reading glass 122 over the stopped reader unit 110. In the fixed-reading mode, an original image placed on the original table glass 121 by the user is read while the reader unit 110 is moved in a sub-scanning direction. In the case of the fixed-reading mode, the original on the original table glass 121 is optically scanned by reciprocating movement of the reader unit 110 in the sub-scanning direction.

In the flow reading mode and the fixed-reading mode, the reflected light from the original is guided to the lens 114 by the mirror 113, and is condensed onto the image sensor 115 by the lens 114. The image sensor 115 photoelectrically converts the reflected light that reflects information on the original, and outputs the resultant to a printer unit (not shown) as an electronic image signal, or accumulates the resultant in a memory as data.

Figure 3:
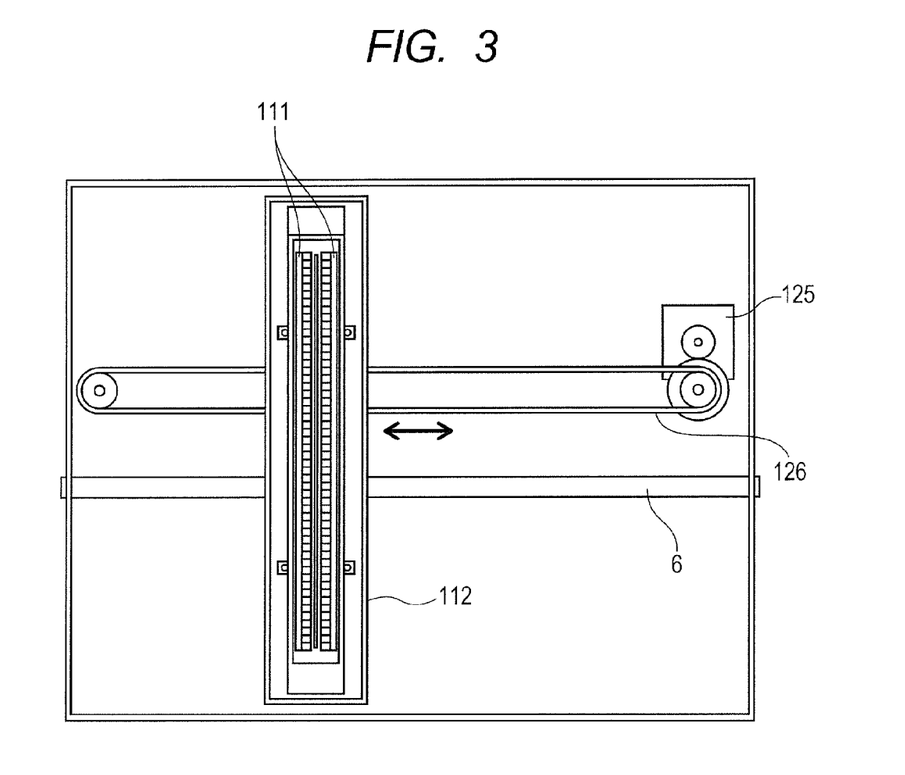
FIG. 3 illustrates a driving mechanism for the above-mentioned reader unit.

The reader unit 110 is coupled to a motor 125 by a timing belt 126 illustrated in FIG. 3, and the reader unit 110 is controlled to move in parallel with the original table glass 121 and the flow reading glass 122 by rotary drive of the motor 125. In FIG. 1, a position sensor 124 senses a home position of the reader unit 110. A scanner controller 404 illustrated in FIG. 4 causes the motor 125 to rotate in forward and reverse directions with reference to a position of the position sensor 124, to thereby move the reader unit 110 and optically scan the original on the original table glass 121 and the flow reading glass 122.

Figure 4:
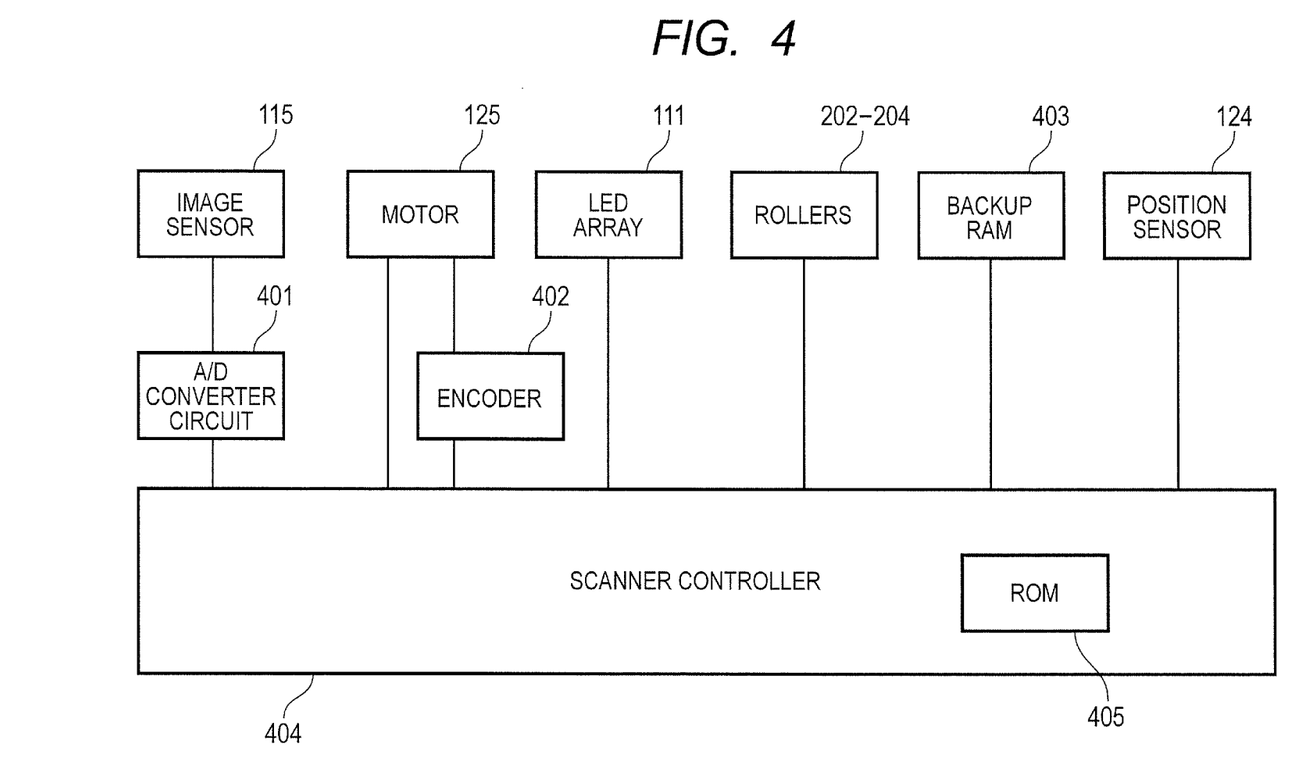
FIG. 4 is a control block diagram of the above-mentioned image reading apparatus.

The motor 125 is formed of a stepping motor. The motor 125 is connected to an encoder 402 As illustrated in FIG. 4. An output from the encoder 402 allows the scanner controller 404 to recognize how many pulses the reader unit 110 has moved by. In other words, the scanner controller 404 can grasp the position of the reader unit 110 based on a detection signal from the position sensor 124 and an encoder pulse from the encoder 402.

As illustrated in FIG. 1, the ADF 200 has a rear part connected to the upper surface of the apparatus main body 100A through a hinge (not shown), and is provided to the apparatus main body 100A so as to be free to open and close through the intermediation of the hinge. At a time of the fixed-reading mode, the user lifts a front part of the ADF 200, and places the original on the original table glass 121 that has appeared. The ADF 200 is provided with an original tray 205 on which originals are to be stacked and a sheet feeding roller 202. In the case of the flow reading mode, the originals are sent out by the sheet feeding roller 202, and then separated by a separation unit one by one. Then, the original is conveyed toward the flow reading glass 122 by conveying rollers 203 provided on an upstream side in a conveying direction (upstream side in a sheet conveying direction) of the original reading position 210.

When passing across the flow reading glass 122 being original reading glass, as illustrated in FIG. 2, the original passes between the flow reading glass 122 and a conveyance guide member 201 disposed on an opposed side of the original reading position 210 of the ADF 200. During the course of passage thereof, the original is optically scanned by the reader unit 110 located under the original reading position 210 to have the image read. After having the image read, the original is lifted up by a jump ramp 123 provided between the original table glass 121 and the flow reading glass 122, and conveyed to original delivery rollers 208 by conveying rollers 204 illustrated in FIG. 1. After that, the original is delivered to a delivery tray 206 by the original delivery rollers 208.

As illustrated in FIG. 2, the conveyance guide member 201 for guiding the conveyed original has a first guide surface 201a and a second guide surface 201b in its bottom surface. The first guide surface 201a on a downstream side of the conveyance guide member 201 regulates a position of the original in its thickness direction, and has a shape curved downward so as to have a narrow clearance with respect to the flow reading glass 122.

By having the first guide surface 201a regulating the thickness direction position of the original, the conveyance guide member 201 prevents deterioration in image reading accuracy due to flapping of the original without increasing conveyance load. In this embodiment, the position of the original is regulated by the first guide surface 201a in a location spaced apart from the original reading position 210.

The location in which the height of the original is regulated by the first guide surface 201a may be on an upstream side of the original reading position 210. Then, by providing the first guide surface 201a on the upstream side or the downstream side of the original reading position 210, it is possible to prevent a surface of the conveyance guide member 201 corresponding to the original reading position 210 from being worn out by originals due to deterioration in endurance. Accordingly, it is possible to perform light distribution fluctuation correction described later without fail.

The second guide surface 201b has an inclined flat shape, and is connected to the first guide surface 201a with a smooth curvature. By providing the second guide surface 201b, even when the original is curled upward, it is possible to cause the original to pass between the conveyance guide member 201 and the flow reading glass 122 without causing a jam in the original reading position 210.

The original table glass 121 is provided with a white reference white plate 127 being a first white reference member for shading correction. In this embodiment, the conveyance guide member 201 is used as a second white reference member different from the white reference white plate 127. The first guide surface 201a and the second guide surface 201b of the conveyance guide member 201 each have a surface having such a shape as to be a diffuse reflecting surface that diffuses light irradiated from the LED arrays 111 over an entire surface opposed to the reader unit 110. Specifically, the surfaces of the first guide surface 201a and the second guide surface 201b are subjected to processing for adding irregularities such as embossing processing or honing processing, to thereby assume the guide surfaces as diffuse reflecting surfaces.

FIG. 4 is a control block diagram of the image reading apparatus 100. The scanner controller 404 controls the sheet feeding roller 202 for conveying the original, the conveying rollers 203, the conveying rollers 204, the LED arrays 111 for irradiating the surface of the original with light, and the motor 125 for moving the reader unit 110 in the sub-scanning direction to scan the original. Further, the scanner controller 404 controls the image sensor 115 for photoelectrically converting the reflected light from the surface of the original and an A/D converter circuit 401 for A/D-converting an output signal from the image sensor 115.

The scanner controller 404 is connected to the encoder 402 connected to the motor 125, the position sensor 124, and a backup RAM 403 for setting a normal original reading position used in the flow reading. Further, a ROM 405 that stores various programs is provided inside the scanner controller 404.

Figure 5:
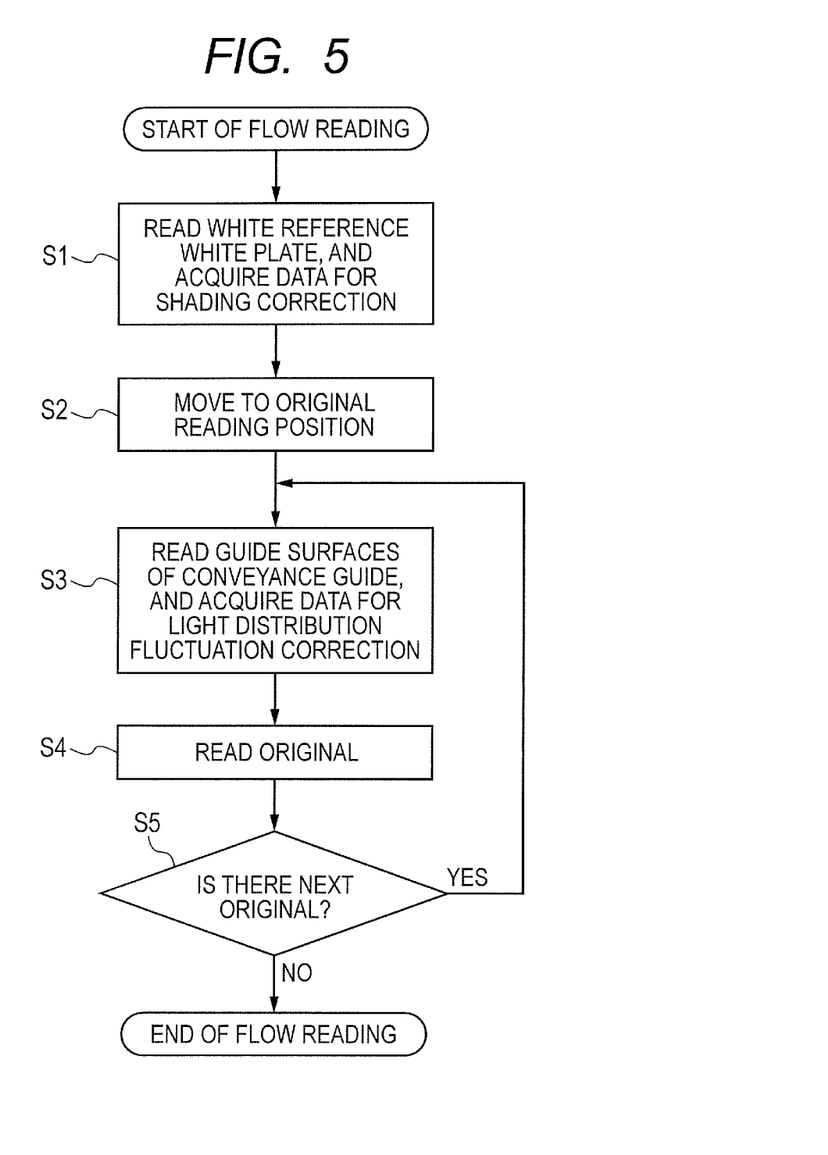
FIG. 5 is a flowchart illustrating a flow reading operation of the above-mentioned image reading apparatus.

Next, a flow reading operation performed by the image reading apparatus 100 according to this embodiment is described with reference to a flowchart illustrated in FIG. 5. In this embodiment, before starting the flow reading operation, the reader unit 110 first irradiates light to the white reference white plate 127 existing above the home position to detect the reflected light, to thereby read the white reference white plate 127 and acquire data for shading correction (S1).

Subsequently, the reader unit 110 moves to the original reading position while passing under the jump ramp 123 (S2), and irradiates light to the first guide surface 201a and the second guide surface 201b of the conveyance guide member 201 to detect the reflected light. Accordingly, data for light distribution fluctuation correction is acquired (S3). Subsequently, the original is read (S4), and then it is determined whether or not there is a next original (S5). When there is a next original (Y in S5), the conveyance guide member 201 is again read between the originals (S3), and the original is read. When there is no next original (N in S5), the flow reading is brought to an end.

Figure 6:
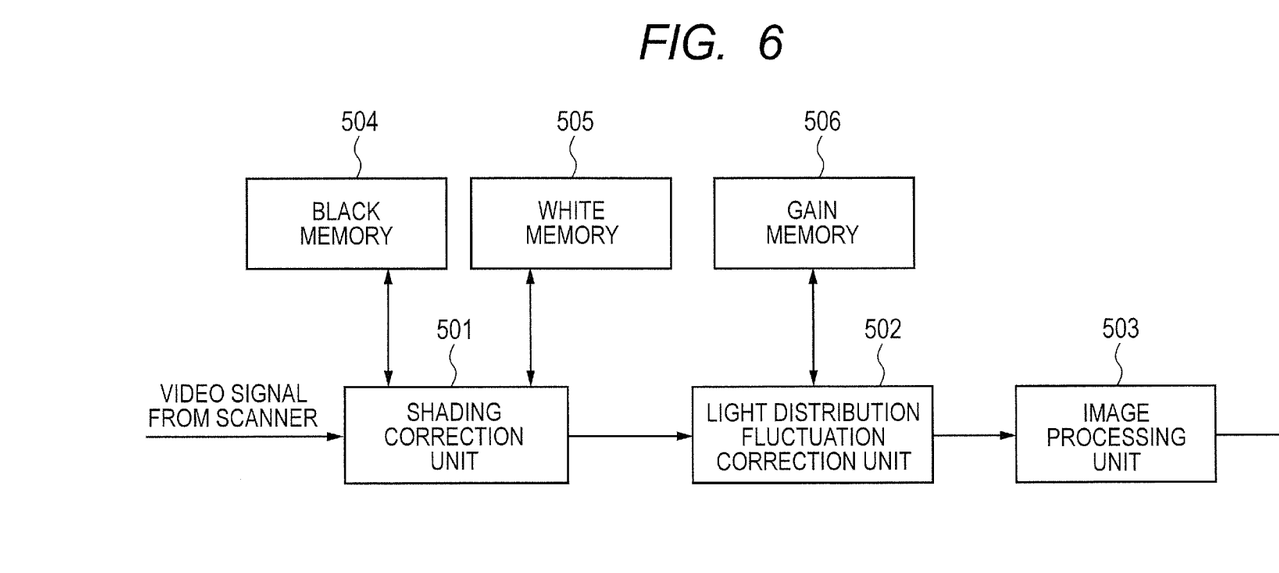
FIG. 6 is a block diagram illustrating a configuration of the above-mentioned image reading apparatus relating to shading correction.

In a case of performing the shading correction, as illustrated in FIG. 6, image information on the white reference white plate 127 read by the image sensor 115 is input to a shading correction unit 501, and is subjected to known shading correction by the shading correction unit 501. After being subjected to the shading correction, the image information being correction information is input to a black memory 504 for saving a black reference value and a white memory 505 for saving a white reference value. In the reading of the original, the image information being the correction information of the conveyance guide member 201 read between the originals by the image sensor 115 is input to a light distribution fluctuation correction unit 502, and is subject to the light distribution fluctuation correction by the light distribution fluctuation correction unit 502.

In the light distribution fluctuation correction according to this embodiment, for each interval between the originals, an average value of light amounts is acquired from image data corresponding to a predetermined number of pixels at several points of a reference target object in the main scanning direction, and fluctuation amounts of the light amounts are calculated, to thereby correct light distribution fluctuations of illumination in the main scanning direction. In the light distribution fluctuation correction, first, before reading the image of the first original among multiple originals, the white reference white plate 127 is read by the image reading unit to create shading correction data. Before reading the first original, the conveyance guide member 201 is illuminated by the image reading unit, and light amount values from the illuminated conveyance guide member 201 are sampled to create first pieces of data. Subsequently, after reading the first image, the light amount values from the conveyance guide member 201 illuminated by the image reading unit are sampled to create second pieces of data. The fluctuation amounts of the light amounts are obtained by comparing the first pieces of data with the second pieces of data, and the shading correction data is corrected by using the fluctuation amounts of the light amounts to correct the image data.

Figure 7A:
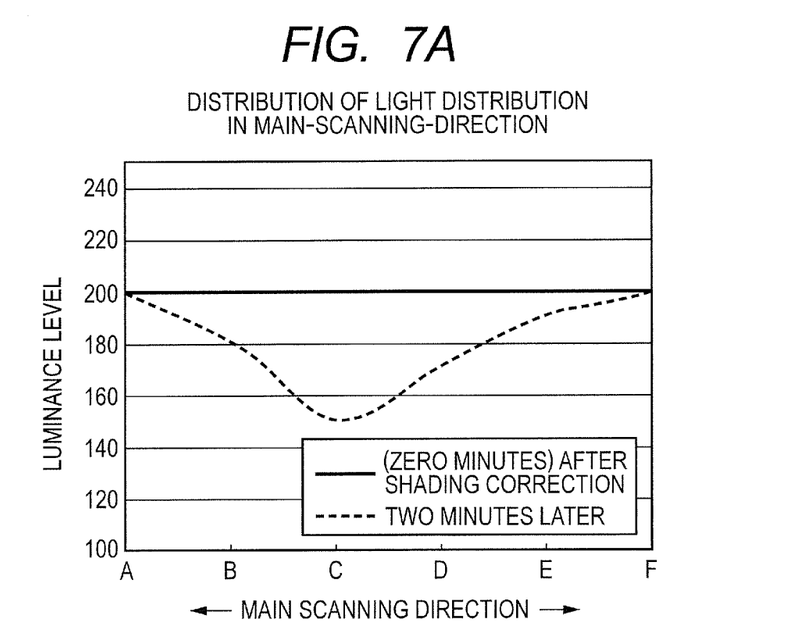
FIG. 7A illustrates a distribution of light distribution obtained when a conveyance guide member is read.
Figure 7B:
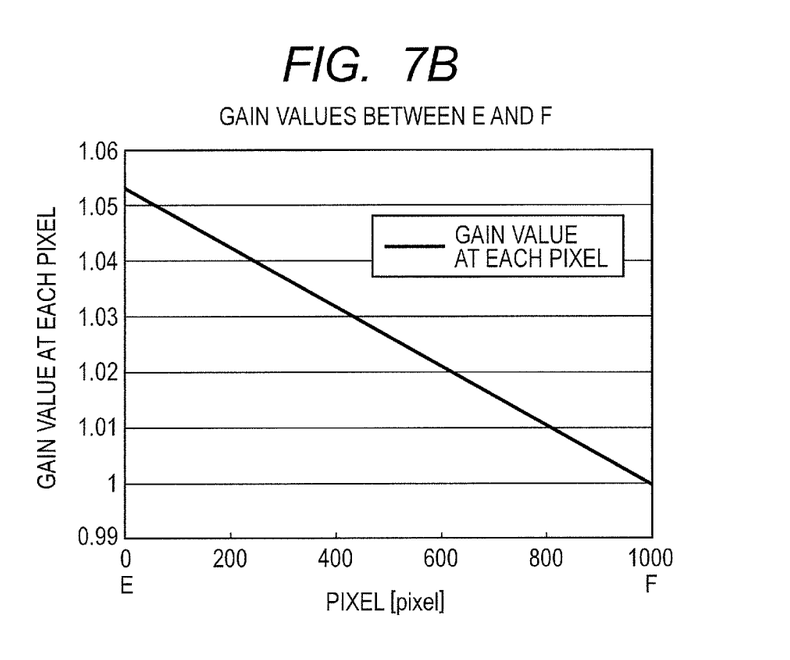
FIG. 7B illustrates gain values between sample points.

Referring to FIGS. 7A and 7B, the light distribution fluctuation correction performed by the light distribution fluctuation correction unit 502 is described in detail. FIG. 7A illustrates a distribution of light distribution in the main scanning direction obtained when the conveyance guide member 201 is read at the interval between the originals, which is an interval after the original image is read until the reading of the next original image is started. As apparent from FIG. 7A, a luminance level is substantially flat after the shading correction (zero minutes), but the luminance level (light distribution) fluctuates two minutes later. If the reader unit 110 is moved to the white reference white plate 127 before the next original is conveyed in order to correct the light distribution fluctuations, efficiency in reading considerably deteriorates. Therefore, in this embodiment, while the reader unit 110 is fixed to a flow reading position, a fluctuation amount of the light amount is corrected by using the conveyance guide member 201 being the second white reference member located so as to be opposed to the reader unit 110.

Figure 8:
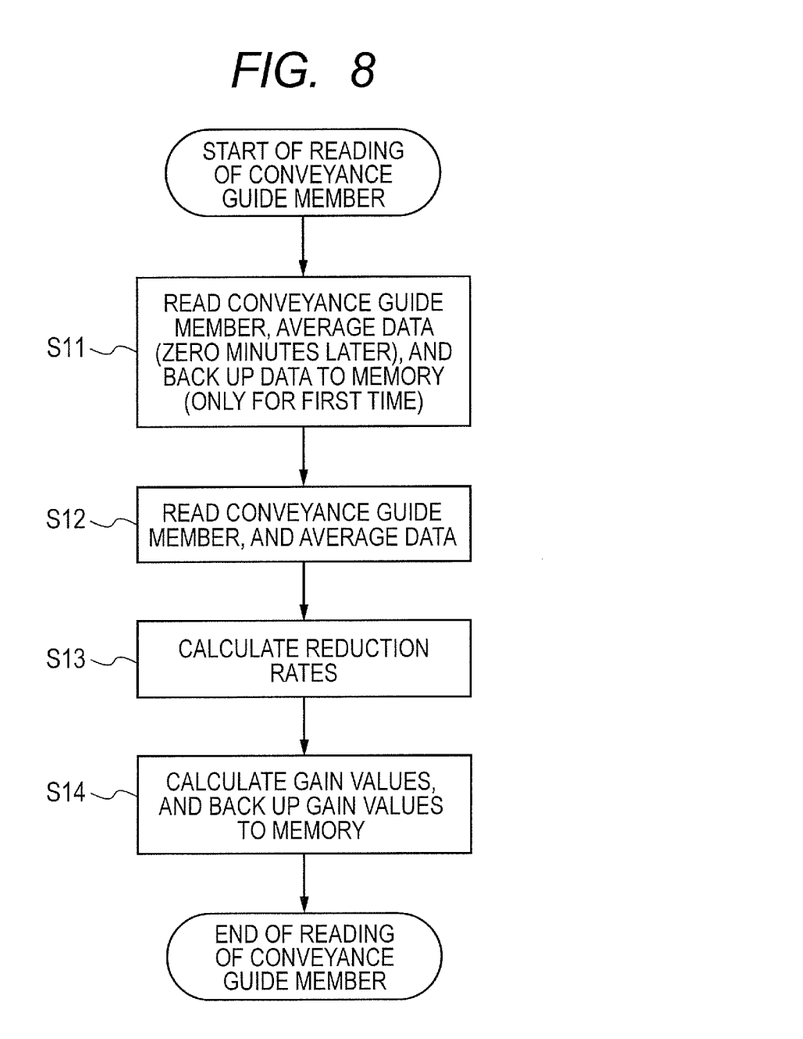
FIG. 8 is a flowchart illustrating an operation of reading the conveyance guide member of the above-mentioned image reading apparatus between originals.

Next, an operation for reading the conveyance guide member 201 in the image reading apparatus according to this embodiment at a time of the flow reading operation is described with reference to a flowchart illustrated in FIG. 8. First, before the flow reading operation is started, the image data (image information) on the conveyance guide member 201 being a reference corresponding to m pixels in the main scanning direction and n pixels in the sub-scanning direction is sampled by the reader unit 110 at multiple points in the main scanning direction. Then, conveyance guide member read data (zero minutes later) being first correction information is averaged at each point, and the averaged read data is backed up (stored) to the black memory 504 and the white memory 505 illustrated in FIG. 6 as an average luminance level of the conveyance guide member 201 (S11). Backup processing of the averaged read data to the memory is performed only for the first time.

After that, multiple originals are read. In this case, the conveyance guide member 201 corresponding to m pixels in the main scanning direction and n pixels in the sub-scanning direction is again sampled at the interval between the originals at the multiple points in the main scanning direction in the same manner as in Step S11. The conveyance guide member read data being second correction information that is read again is averaged at each point (S12). After that, average luminance levels of the conveyance guide member at the interval between the originals, which are average values calculated at the respective points, are used to calculate reduction rates based on the following expression (S13).

(reduction rate)=(average luminance level of conveyance guide member at the interval between originals)/(average luminance level of conveyance guide member)

Subsequently, gain values at the respective points are obtained based on the reduction rates, which are comparison results of comparing the first correction information with the second correction information, by the following expression, and are backed up to a gain memory 506 illustrated in FIG. 6 (S14). Accordingly, the reading of the conveyance guide member 201 is brought to an end.

(gain value)=1/(reduction rate)

Figure 9:
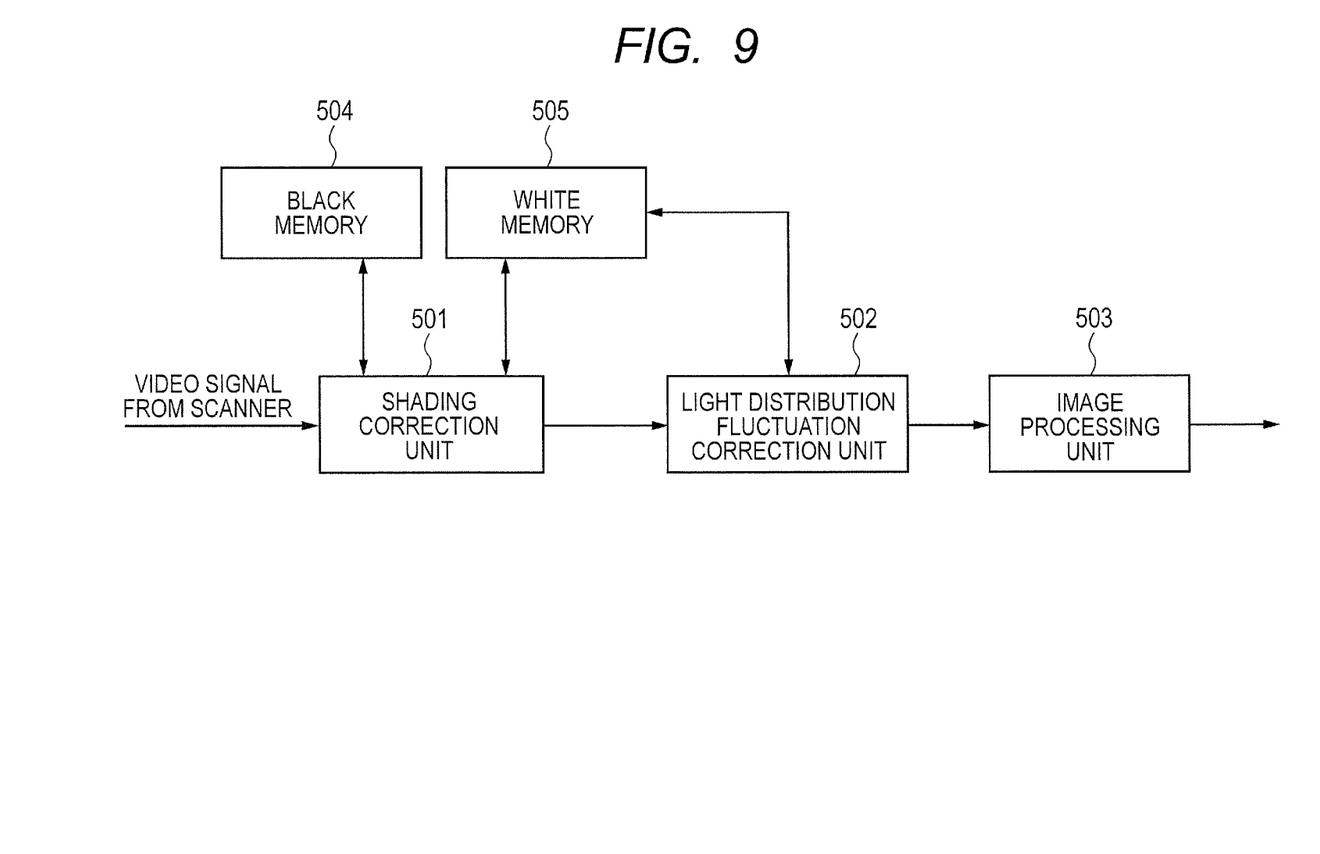
FIG. 9 is a block diagram illustrating another configuration of the above-mentioned image reading apparatus relating to the shading correction.

In a case where the gain memory 506 for a light distribution fluctuation correction unit cannot be reserved, as illustrated in, for example, FIG. 9, the gain values of the white memory 505 of a shading correction unit may be rewritten into gain values obtained in consideration of the light distribution fluctuation correction as well.

In this embodiment, as illustrated in FIG. 7B, the gain values between the multiple points are approximated by a primary expression by using the gain values at two points to obtain the gain values. With this method, it is possible to calculate the gain values corresponding to all the pixels by monotonically increasing or monotonically decreasing without providing an excess memory. The light distribution fluctuation correction unit 502 performs an arithmetic operation for the light distribution fluctuation correction by using the above-mentioned data.

The arithmetic operation for the light distribution fluctuation correction may be performed at the interval between the originals each time one sheet of the original is read or each time a predetermined number of sheets thereof are read. For example, the light distribution fluctuation correction is performed at short intervals at an early stage of a time during which the fluctuation amount of an LED array is relatively large, and when the light amount of the LED array becomes stable after the lapse of some time, the light distribution fluctuation correction may be performed at long intervals.

In order to appropriately perform the light distribution fluctuation correction, the luminance levels of a read surface of the conveyance guide member 201 being the second white reference member need to be uniform in the main scanning direction and the sub-scanning direction. The white reference white plate 127 and a background member (specifically, conveyance guide member 201) have different densities, but the white reference white plate 127 has the density managed so as to be a reference of the read original, and therefore has the luminance levels uniform.

Figure 10A:
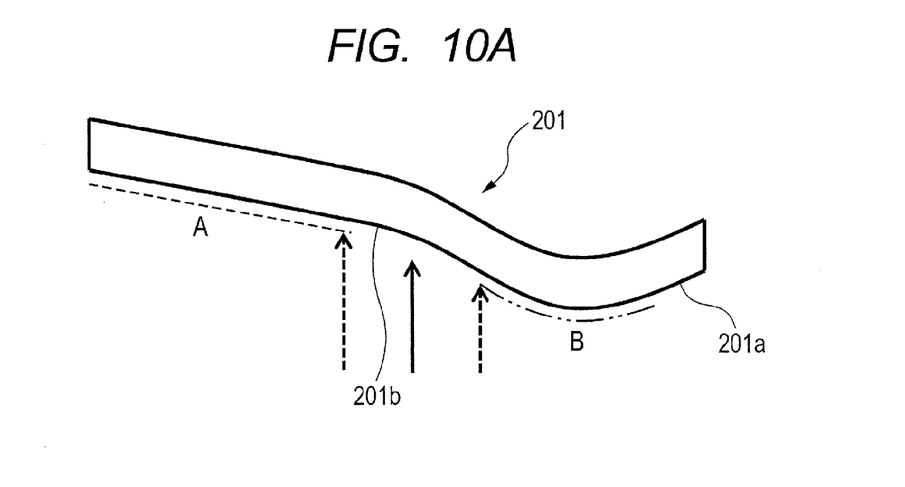
FIG. 10A is an enlarged view of the conveyance guide member.
Figure 10B:
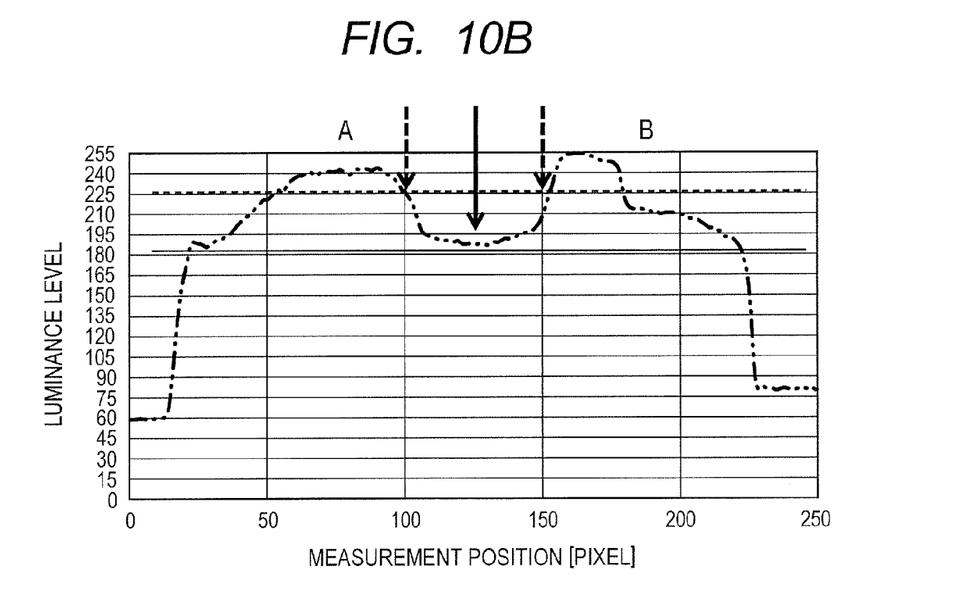
FIG. 10B illustrates a section of luminance in a sub-scanning direction obtained when guide surfaces of the conveyance guide member are read while the reader unit is scanned in the sub-scanning direction.

Next, uniformity in the luminance levels required when the conveyance guide member 201 is utilized as the second white reference member is described. FIG. 10A is an enlarged view of the conveyance guide member 201. FIG. 10B illustrates a section of luminance in the sub-scanning direction obtained when the guide surfaces of the conveyance guide member 201 are read while the reader unit 110 scans in the sub-scanning direction.

Arrows (solid lines) illustrated in FIGS. 10A and 10B indicate light that is irradiated from the LED arrays 111 and passes through the original reading position of the flow reading. A region A and a region B are regions in which the light irradiated from the LED arrays 111 is specularly reflected by the second guide surface 201b and the first guide surface 201a, respectively, of the conveyance guide member 201 to enter the light-receiving element (image sensor 115).

As illustrated in FIG. 10B, in the region A and the region B in which the light irradiated from the LED arrays 111 is specularly reflected to enter the light-receiving element, the luminance levels are higher. The region A in which specularly reflected light enters the light-receiving element is the second guide surface 201b that is flat, and is inclined relative to flow reading glass. The region B in which the specularly reflected light enters the light-receiving element is a region of the first guide surface 201a having a curvature. In other words, if the conveyance guide member 201 has a shape including the second guide surface 201b that is inclined and flat and the first guide surface 201a having a curvature, the specularly reflected light enters the light-receiving element from multiple regions.

In a case of performing the light distribution fluctuation correction, before the original is read, the luminance levels obtained by reading the first guide surface 201a and the second guide surface 201b of the conveyance guide member 201 in the original reading position are compared with the luminance levels obtained after the original is passed, and the fluctuation amounts of the light amounts are calculated, to thereby perform the correction. If there is no deviation in the position of the light (solid line) that is irradiated from the LED arrays 111 and passes through the original reading position all the time, the light distribution fluctuations can be appropriately corrected by comparing only changes of the luminance levels, in other words, the light amounts of the LED arrays 111.

However, it is conceivable that a positional relationship between the original reading position of the reader unit 110 and the conveyance guide member 201 deviates in the sub-scanning direction by a deviation due to mechanical looseness of the conveyance guide member 201, a deviation of the reader unit 110 due to a temperature increase of the light source or the like, or other such factor before and after the original is conveyed. For example, when the original reading position of the reader unit 110 is moved to the position of an arrow (broken line) illustrated in FIGS. 10A and 10B, the luminance levels obtained at this time become as high luminance levels as indicated by the broken lines or chain double-dashed line.

The light distribution fluctuation correction unit 502, which is a correction unit for correcting the image information based on the comparison results and the data for shading correction, calculates a change amount of the light amount based on the luminance level to perform the light distribution fluctuation correction. However, if the light distribution fluctuation correction unit 502 calculates the change amount of the light amount based on the high luminance level and performs the light distribution fluctuation correction, the correction reduces the light amount in the region in which the specularly reflected light enters the light-receiving element. Therefore, the original read image becomes partially dark, which causes image degradation. In other words, in a case where there is no uniformity in the luminance levels and there is an abrupt change of the luminance levels in the vicinity of the original reading position, when the light distribution fluctuation correction unit 502 performs the light distribution fluctuation correction based on the luminance levels, the image degradation is caused.

In this embodiment, the surfaces of the first guide surface 201a and the second guide surface 201b of the conveyance guide member 201 are subjected to the processing for adding irregularities such as embossing or honing to the surface, and the light irradiated from the LED arrays 111 is dispersed. In other words, in this embodiment, by adding the irregularities to the surfaces of the first guide surface 201a and the second guide surface 201b of the conveyance guide member 201, the first guide surface 201a and the second guide surface 201b are assumed as the diffuse reflecting surfaces for diffusing and reflecting light. Accordingly, also in an inclined surface of the second guide surface 201b and a curvature portion of the first guide surface 201a, in which the specularly reflected light enters the light-receiving element, the luminance level can be stabilized by dispersing the light irradiated from the LED arrays 111.

Figure 11A:
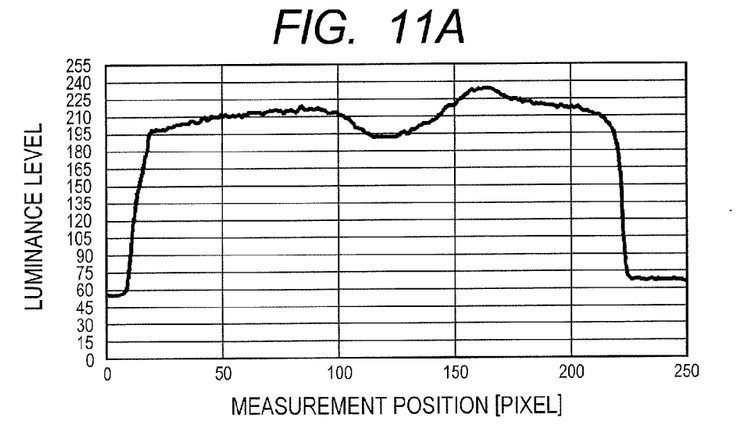
FIGS. 11A, 11B and 11C illustrate sections of luminance of the guide surfaces of the conveyance guide member according to the embodiment of the present invention.
Figure 11B:
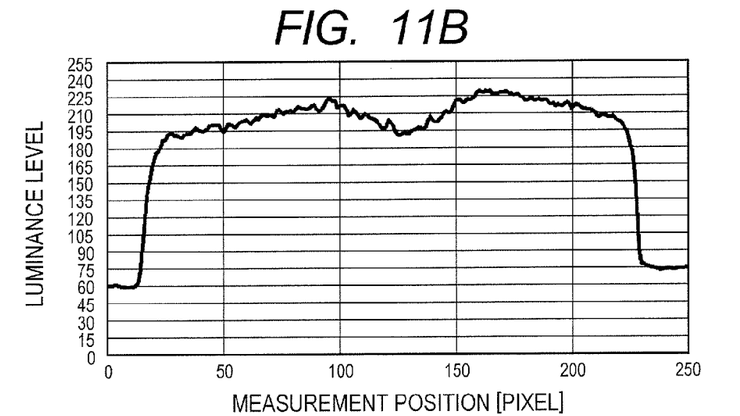
Figure 11C:
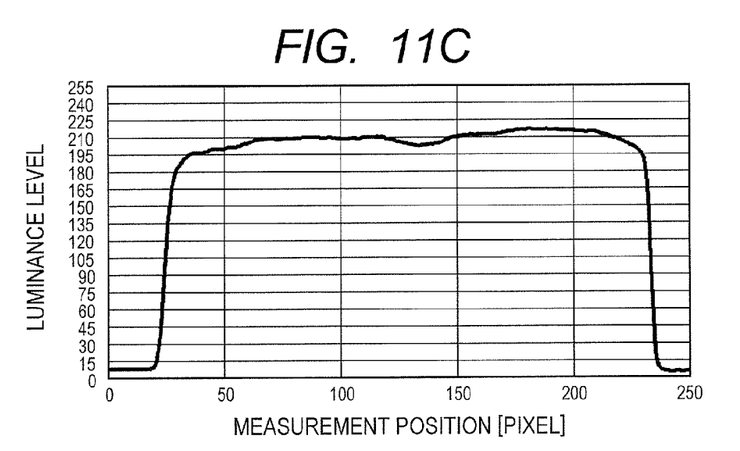

FIGS. 11A to 11C illustrate sections of luminance in the sub-scanning direction obtained by subjecting the first guide surface 201a and the second guide surface 201b of the conveyance guide member 201 to processing for adding the irregularities in three patterns. FIG. 11A illustrates a pattern in which the irregularities are small in depth and have narrow intervals. FIG. 11B illustrates a pattern in which the irregularities are large in depth and have wide intervals. FIG. 11C illustrates a pattern in which the irregularities are large in depth and have narrow intervals.

Figure 12A:
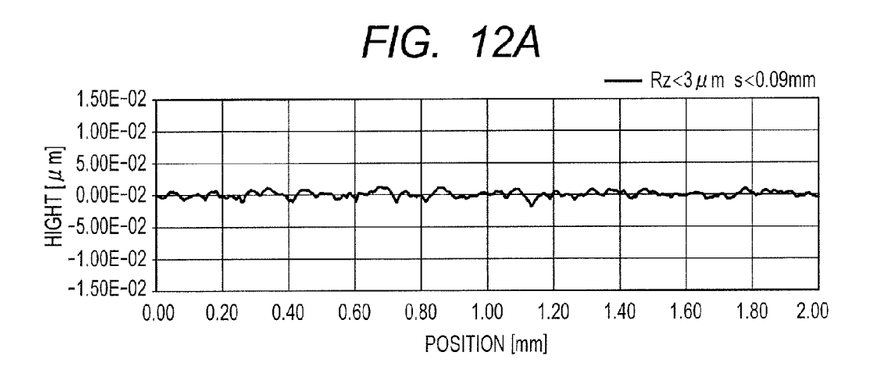
FIGS. 12A, 12B and 12C illustrate profile curves of the guide surfaces of the conveyance guide member according to the embodiment of the present invention.
Figure 12B:
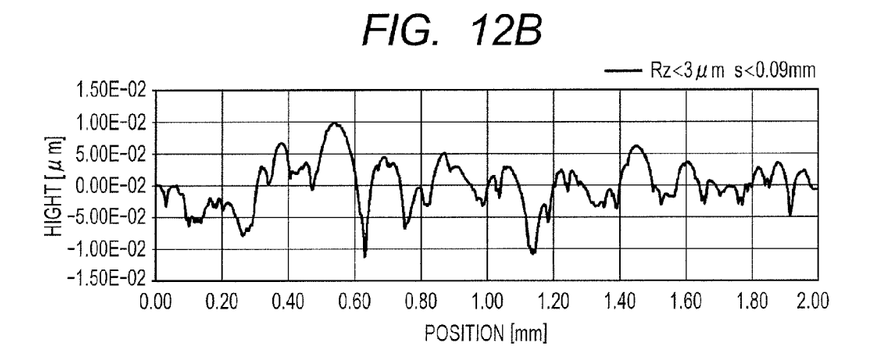
Figure 12C:
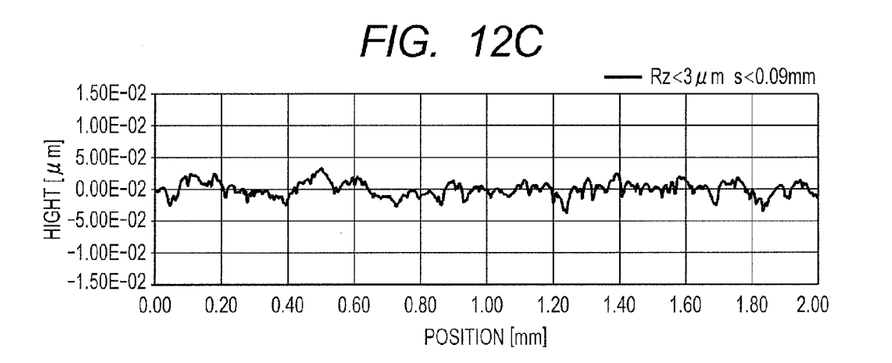

FIGS. 12A to 12C illustrate profile curves in the sub-scanning direction obtained in the respective three patterns of surface processing. FIG. 12A illustrates the profile curve in the sub-scanning direction obtained in the pattern in which the irregularities are small in depth and have narrow intervals. FIG. 12B illustrates the profile curve in the sub-scanning direction obtained in the pattern in which the irregularities are large in depth and have wide intervals. FIG. 12C illustrates the profile curve in the sub-scanning direction obtained in the pattern in which the irregularities are large in depth and have narrow intervals.

In the case where the irregularities are small in depth as illustrated in FIG. 12A, even if the intervals are narrow, a planar profile curve is obtained, and an effect of dispersing the light irradiated from the light source is insufficient. Therefore, as illustrated in FIG. 11A, the regions exhibiting the high luminance levels remain in the section of luminance. In the same manner, in the case where the intervals are wide even if the irregularities are large in depth as illustrated in FIG. 12B, a gentle profile curve is obtained, and the effect of dispersing the light irradiated from the light source is insufficient. Therefore, as illustrated in FIG. 11B, the regions exhibiting the high luminance levels remain in the section of luminance. In contrast, as illustrated in FIG. 12C, in the case where the irregularities are large in depth and have narrow intervals, it is possible to disperse the light irradiated from the light source, and the section of luminance can be stabilized as illustrated in FIG. 11C.

Next, shapes of the first guide surface 201a and the second guide surface 201b according to an example of this embodiment are described. In this example, a level at which the image degradation occurs as an adverse effect of the light distribution fluctuation correction is set to a fluctuation amount of the luminance level equal to or larger than ten levels. In this case, the guide surface that can sufficiently disperse the specularly reflected light so that the change amount of the luminance level becomes smaller than ten levels needs to have a sufficiently large depth of grooves of the irregularities, specifically, needs to have a sufficiently large ten-point average surface roughness Rz (according to JIS B 0601-1994). The guide surface needs to have sufficiently narrow intervals between the irregularities, specifically, needs to have a sufficiently small average distance S between local peaks (JIS B 0601-1994).

It was found from experimental results that the ten-point average surface roughness Rz needs to satisfy "3.0 μm<Rz<∞ (as large as the shape that can be processed)" in order to set the fluctuation amount of the luminance level smaller than ten levels in the shape of the guide having the inclined surface and the curvature. In addition, it was found that the average distance S between local peaks needs to satisfy "0 mm (as small as the shape that can be processed)<S<0.09 mm".

By giving surface properties that satisfy the above-mentioned conditions to the guide surface of the conveyance guide member 201, the luminance levels in the sub-scanning direction can be made uniform, even if the conveyance guide member 201 is provided with the guide surface having the inclined surface and a curvature surface. By using such a conveyance guide member 201, the reduction rate of the light amount can be appropriately calculated even in the case where the conveyance guide member 201 moves in the sub-scanning direction by an amount corresponding to the mechanical constitutional looseness, the case where the original reading position of the reader unit 110 deviates during the continuous flow reading, and other such case.

By being provided with the surface properties as illustrated in FIG. 12C that satisfy the above-mentioned conditions, the light can be sufficiently dispersed in a specular reflection region, even if the conveyance guide member 201 has a shape having the inclined surface and the curvature as to cause the specularly reflected light from the light source to enter the light-receiving element. As a result, in the correction of the image data, it is possible to suppress such overcorrection as to excessively correct the image data to a level that inhibits the image data from being recognized as the image.

As described above, in this embodiment, the surface of the conveyance guide member 201 located over the original reading position at the interval between the originals is set as a surface having such a shape as to disperse the light. Accordingly, fluctuations in the light distribution and the light amount of the light source can be appropriately corrected without performing the overcorrection by reading the specularly reflected light, which can prevent deterioration in image quality due to the fluctuations in the light distribution or the light amount.

In other words, by providing the conveyance guide member 201 being the second white reference member with the diffuse reflecting surface for diffusing and reflecting the light irradiated from the light source, it is possible to diffuse the light from the light source owing to the shape of the surface of the conveyance guide member 201. Accordingly, without causing upsizing of the apparatus, it is possible to prevent the image degradation due to specular reflection of the light from the light source without fail.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-140637, filed Jun. 22, 2012, which is hereby incorporated by reference herein in its entirety.

What is claimed is:

1. An image reading apparatus, comprising:
   an image reading unit which has a light source irradiating light to a sheet conveyed along reading glass, and an image reading element reading an image by reflected light from the sheet;
   a conveyance guide portion which guides a sheet and which is disposed in a position, that corresponds to the image reading unit, with the reading glass interposed between the conveyance guide portion and the image reading unit; and
   a correction unit which corrects image information obtained by reading a sheet by the image reading unit based on reflected light that is emitted from the light source and reflected on a reflecting surface of the conveyance guide portion;
   wherein the reflecting surface has surface properties having a ten-point average surface roughness Rz and an average distance S between local peaks satisfying the following requirements,
   3.0 μm<Rz, and
   S<0.09 mm.

2. An image reading apparatus according to claim 1, further comprising a white reference member for obtaining correction information used for correcting the image information which is obtained by reading the sheet by the image reading unit,
   wherein the correction unit corrects the image information based on a first correction information obtained by reading the conveyance guide portion by the image reading unit, a second correction information obtained by reading again the conveyance guide portion by the image reading unit after reading the image of the sheet conveyed after the conveyance guide portion is read in order to obtain the first correction information, and the correction information obtained by reading the white reference member by the image reading unit.

3. An image reading apparatus according to claim 1, wherein the reflecting surface of the conveyance guide portion has a curved guide surface guiding the conveyed sheet.

4. An image reading apparatus according to claim 1, wherein the conveyance guide portion has a surface having a shape of irregularities.

5. An image reading apparatus according to claim 4, wherein the surface of the conveyance guide portion has the shape of irregularities by one of embossing and honing.

6. An image reading apparatus according to claim 1, wherein the surface of the conveyance guide portion is white.

7. An image forming apparatus, comprising:
   the image reading apparatus according to claim 1; and
   an image forming unit which forms an image based on image information read by the image reading apparatus.

8. An image reading apparatus according to claim 1, wherein the conveyance guide portion is fixed.

9. An image reading apparatus according to claim 1, further comprising a white reference member for obtaining correction information used for correcting the image information which is obtained by reading the sheet by the image reading unit,
   wherein the correction unit corrects the image information based on the reflected light that is reflected on the reflecting surface of the conveyance guide portion and reflected light that is emitted from the light source and reflected on a reflecting surface of the white reference member.

10. An image reading apparatus, comprising:
    an image reading unit which has a light source irradiating light to a conveyed sheet, and an image reading element reading an image by reflected light from the sheet;
    a conveyance guide portion which guides the conveyed sheet in a position for reading the image of the sheet;
    a correction unit which corrects image information obtained by reading the sheet by the image reading unit by using information of reflected light that is emitted from the light source and reflected on the conveyance guide portion; and
    a reflecting surface which is provided to the conveyance guide portion and reflects the light from the light source, and the reflecting surface having a ten-point average surface roughness Rz and an average distance S between local peaks satisfying the following requirements,
    3.0 μm<Rz, and
    S<0.09 mm.

11. An image reading apparatus according to claim 10, wherein the conveyance guide portion is fixed, and the reflecting surface of the conveyance guide portion is curved.

12. An image reading apparatus according to claim 10, further comprising a white reference member for obtaining correction information used for correcting the image information which is obtained by reading the sheet by the image reading unit,
  wherein the correction unit corrects the image information based on the reflected light that is reflected on the reflecting surface of the conveyance guide portion and reflected light that is emitted from the light source and reflected on a reflecting surface of the white reference member.

13. An image forming apparatus, comprising:
  the image reading apparatus according to claim 10; and
  an image forming unit which forms an image based on image information read by the image reading apparatus.

* * * * *